Patented Dec. 5, 1944

2,364,090

UNITED STATES PATENT OFFICE 2,364,090

PURIFYING RESINS

Adriaan Nagelvoort, Salt Lake City, Utah

No Drawing. Application February 23, 1942,
Serial No. 432,087

2 Claims. (Cl. 260—107)

This invention relates to purifying resins; and it comprises a method of purifying fossil resins such as those recovered from coal in impure form contaminated with asphalts and waxes, which comprises the steps of dissolving the crude resin in a solvent, admixing with the solution, in quantity sufficient to cause precipitation of the asphalts, a liquid which in admixture with said solvent is a solvent for the resins but is not a solvent for the asphalts and which advantageously is less volatile than said first-named solvent, separating the asphalts, subjecting the solution to evaporation until at least some of the resins are precipitated, and separating the precipitated resins, leaving waxes in solution; all as more fully hereinafter set forth and as claimed.

Hard copal resins of the kauri type exist as inclusions in various coals, notably the upper seams of Utah bituminous coal. The resins are scattered through the coal in small lumps, of sizes ranging from that of sand to walnut size. They vary in color from lemon yellow to deep red. These resins in their natural state are contaminated with waxes and asphalts intimately associated therewith, perhaps in solid solution with the resins.

In a prior and copending application Serial No. 368,737, filed December 5, 1940, for Recovering resins from coal, I have disclosed and claimed a method of separating resins from coal, and subsequently effecting a further separation of the recovered resin from some of the asphalt and wax impurities. The process involves successive separations by sink-and-float procedures carried out in saline solutions with the aid of wetting agents to cause a separation purely on the basis of the difference in real densities between the resins and the impurities. The final recovered resins are insoluble in most solvents but like the kauri type copals they are or can be made soluble in drying oils such as linseed oil. Useful varnishes are prepared therefrom in this way.

Resins recovered as described are relatively pure but are still contaminated with an undesirable amount of wax and asphalt impurities, which render varnishes prepared from the resins less useful than they otherwise would be.

According to the present invention a method is provided of purifying these recovered resins in such manner that the product is almost entirely free of waxes and asphalts. Resins produced by the present invention yield varnishes of the very highest grade, clear and light in color and of excellent film-forming characteristics.

The invention involves dissolving the resin, recovered from coal as described by sink-and-float methods, in a solvent which dissolves the resin with all its associated impurities; e. g. petroleum naphtha diluted with a little alcohol. Then there is mixed in a liquid (e. g. alcohol) which in admixture with the naphtha is a solvent for resins and waxes but not for the asphalts; enough being added to cause all the asphalt content to be precipitated. The asphalts are separated by filtration or the equivalent and the solution is subjected to evaporation, whereupon the higher melting point resins begin to precipitate. Evaporation is continued until most of the naphtha is driven off and some of the alcohol, and the resin is filtered off. Heating is continued, and the waxes now are precipitated and are filtered off. The remaining alcohol is boiled away with precipitation of a pure, low melting point resin. For some reason this last resin shows the greatest solubility of all the components during the evaporation but when once dry it is no longer soluble in alcohol.

The high melting point resin is the most valuable of the several products. The other products all have uses.

In typical cases the crude resin as recovered from coal by sink-and-float as described has about the following composition:

| | Percent |
|---|---|
| High melting point resin | 50 |
| Low melting point resin | 10 |
| Asphalt | 35 |
| Waxes | 5 |

Thus the yield of the kauri-type resin is about 50 per cent of the crude resin, or roughly 5 per cent of the original coal.

The high melting point resin is pale, hard and odorless, and in general resembles in properties the best natural fossil resins; exceeding them in some respects. Unlike most natural resins, however, it does not have to be "run" to make it soluble in linseed oil or other drying oils; an operation which is associated with a loss in weight of about 25 per cent of a resin when it has to be used. The resin is especially well adapted to making varnishes with dehydrated castor oil. Varnishes made with this vehicle in the case of most resins are apt to dry to a somewhat greasy surface but with the present resin they dry to a brilliant hard surface.

In dissolving the entire crude resin, in the first stage of my process a petroleum naphtha or naphtha plus a little alcohol, is at present regarded as the best solvent. The naphtha is a low boiling point distillate (a cut more volatile than gasoline) from Texas and California oils, and has a boiling point range 35 to 90° C. More volatile naphthas, e. g. having a boiling point range 20 to 40° C. are useful. They require special handling expedients as they exist as vapors at ordinary summer temperatures. Other solvents are useful, including benzol and toluol, used pure or in admixture with naphtha.

For the liquid introduced into the crude resin solution to cause precipitation of the asphalts, ethyl alcohol is the most convenient but other oxygen-containing organic solvents can be employed such as acetone and ether. The alcohol need not be anhydrous; it can be ordinary Cologne spirits (95 per cent alcohol) or 80 or 90 per cent alcohol for example. As a matter of fact there is advantage in having a small amount of water present.

Under the conditions of operation described, the ethyl alcohol and naphtha appear to be completely miscible with each other; there is no evidence of separation into layers.

Whichever solvents are selected it is desirable that the solvent for the whole crude resin have a boiling point lower than that of the solvent added to cause precipitation of the asphalts.

In purifying a crude coal resin by the process of the present invention, it is best to obtain the crude resin from the coal by a sink-and-float procedure as described in the acknowledged copending application, as this gives a fairly pure resin which minimizes the work required of the solvents. In so recovering the crude resin from the coal it is advantageous first to crush the coal so that it passes a one-inch-mesh screen. In this operation the coal is mostly broken to a size greater than $\frac{1}{16}$ inch, but the part that is smaller than this contains 80 per cent of the resin. The resin is more brittle than the coal and moreover it exists as flat lenses which form breaking seams for the coal. The crushed coal is then put through a tumbler—a long rotating tube in which the lumps rub against each other and mechanically dislodge the resin. Some reduction of the resin particle size occurs. The tumbled coal is screened with a $\frac{1}{16}$ inch screen, through which passes about 80 per cent of the total resin. The screenings are now broken in a rod mill to minus-20-mesh size.

If desired the whole coal can be crushed directly to minus-20-mesh size, but the foregoing process has the advantage that the bulk of the coal is left in a relatively coarse, marketable size. It is much better than the raw coal as regards smoke production in combustion.

The screenings (resin plus coal, etc.) are treated while in the rod mill with water containing one part tannic acid per million. Under these conditions 1000 pounds of coal-resin require only about 800 pounds of water for thorough wetting. By using this minimum quantity, wetting is much more rapid and complete than if a great excess of water is used.

In this state the coal is wetted but the resins and waxes are not wetted.

The wetted coal-resin is now flowed in aqueous suspension up a deep pocket classifier of type known in ore dressing; an upright cylinder in which the resin (and a little coal) are floated off while the wetted coal sinks. The floated part or concentrate contains roughly 25 per cent impure resin and 75 per cent coal.

This concentrate in aqueous suspension is now introduced into a log washer where it is treated with water containing 10 parts tannic acid per million. This causes the resins to be wet.

The crude resin is now subjected to sink-and-float separation, as described in the acknowledged copending application. Conveniently the resin is introduced into an open-topped conical vessel, arranged for overflow of floated material and withdrawal of sunken material at the bottom. The vessel contains a body of an aqueous solution of some inert substance, e. g. salt, of specific gravity adjusted between that of the coal and that of the resin, and containing a suitable wetting agent, e. g., tannic acid, saponin, ethyl alcohol or isopropyl alcohol. The coal sinks and the resin together with the waxes, etc., floats.

In the next step the resin is separated from certain dark resinous impurities with the aid of a salt solution of specific gravity just lower than that of the dark resinous impurities and higher than that of the valuable resin, and containing a wetting agent for resins e. g. saponin.

In a further step the wax is floated away from the valuable resin, in a similar way.

The resin concentrate X at this stage can if desired be further separated by sink-and-float methods, into a series of resins of progressively denser, and darker, fractions. The less dense and lighter of these can be employed directly in varnish making if desired. But the darker fractions at least contain enough asphalt as to detract from their qualities as a varnish resin, and these (or if desired the entire resin concentrate) are improved by applying the process of the present invention.

*Example*

In an example illustrative of one good mode of practicing the invention, a 100-pound batch of the wet crude resin concentrate X, which was recovered from Utah soft coal and freed of most of its asphalt and wax content by a sink-and-float procedure as described, was dissolved in 900 pounds of a mixture of 70 per cent naphtha from California crude (boiling point range 35 to 60° C.) and 30 per cent ethyl alcohol. The resin dissolved completely. Water and some dirt sank to the bottom and were separated from the solution by decantation. Alcohol was stirred in until the ratio of naphtha to alcohol was 60:40. Asphalts were precipitated and were removed by filtering, using a filter aid such as activated carbon, activated magnesia, alumina and clays. The solution was put in a distillation vessel, and heat was applied to cause vaporization. Vapors, largely naphtha vapors, were evolved. By the time the bulk of the naphtha and some of the alcohol had been driven off, high melting point resin was precipitated and this was filtered off. Heating was continued in the distillation vessel until about half the alcohol was driven off, at which stage (the naphtha-alcohol ratio being about 20:80) the waxes were precipitated. These were removed by filtering and boiling was continued. Low melting point resin was precipitated, when the naphtha-alcohol ratio reached about 10:90.

The solvent vapors were condensed for reuse by known methods and means.

The yields in this example were as follows:

|  | Pounds |
|---|---|
| High melting point resin | 50 |
| Low melting point resin | 10 |
| Asphalt | 35 |
| Waxes | 5 |

The high melting resin is a pale yellow, hard material, resembling in appearance the best fossil kauri and fossil Congo resins. It is lighter in color than the best fossil kauri. Its melting point is 250° C. It dissolves readily in linseed oil or in dehydroxylated castor oil, using known "cooking" procedures, to form an excellent varnish which applied to panels in the usual way yields hard clear films of great permanence and durability. As an interesting detail the resin is completely odorless and develops no odor on cooking with the vehicle. On the other hand the waxes separated from the resin have the characteristic bad odor noted in cooking ordinary varnish-making resins.

As for the other products separated as described: the low melting resin had a melting point of about 110 to 120° C. and is useful where resins of such characteristics are desired. The asphalt is quite similar to Gilsonite. It can be cooked with linseed oil to yield a varnish useful in some relations. The waxes melt at 100° C. or less and are useful.

In the above example pure naphtha can be used in lieu of the naphtha-alcohol mixture, in dissolving the crude resin, but the mixture is a better solvent than pure naphtha. Ordinarily I use solvents containing from 70 to 90 per cent naphtha and 30 to 10 per cent alcohol. In boiling, the naphtha and alcohol vapors (and some steam) appear to be evolved as an azeotropic mixture.

The relative proportions of solvents and solids in the foregoing example are typical, but they vary somewhat for coals from different seams or localities. It is, however, relatively simple to adjust the ratios, etc., for any given coal-resin and for any particular requirement as to purity of the products.

In some cases in the second stage the alcohol content has to be increased to more than 40 per cent, say, to 50 per cent before all the asphalt comes out. The best relative proportions of the solvents vary with the character of the crude resins treated.

If desired, a simplified procedure can be employed, involving a selective extraction of resins plus waxes from the asphalt impurity. By treating the crude recovered resin directly with a solvent mixture containing 60 per cent naphtha and 40 per cent alcohol, only the resins and waxes dissolve leaving the asphalt undissolved in the form of a powder. The rest of the purification procedure is as in the foregoing specific example. This method is slower than that wherein the crude resins are dissolved completely and the asphalts precipitated therefrom.

While crude fossil kauri and other fossil copals are not identical with the coal resins described, the process of the invention can be applied to them with advantage, following the principles outlined above.

What I claim is:

1. In methods of purifying crude fossil resins of the type found in Utah coal, which resins are contaminated with asphalts and waxes, the improvement which comprises dissolving the crude resin in a solvent comprising a petroleum naphtha of boiling point range 35 to 60° C., admixing with said solution ethyl alcohol in amount such as to cause substantially complete precipitation of the asphalts, separating the asphalts, subjecting the solution to evaporation until resins of high melting point are precipitated, and separating the precipitated resins leaving the waxes in solution.

2. In methods of purifying crude fossil resins of the type found in Utah coal, which resins are contaminated with asphalts and waxes, the improvement which comprises dissolving the crude resin in a solvent comprising petroleum naphtha 70 to 90 per cent and ethyl alcohol 30 to 10 per cent, admixing alcohol with the solution until the proportion of alcohol is between 40 and 50 per cent, whereby to cause precipitation of the aspalts, subjecting the solution to evaporation until resins of high melting point are precipitated and separating the precipitated resins leaving the waves in solution.

ADRIAAN NAGELVOORT.